US006411966B1

(12) United States Patent
Kwan et al.

(10) Patent No.: US 6,411,966 B1
(45) Date of Patent: Jun. 25, 2002

(54) METHOD AND COMPUTER READABLE MEDIUM FOR DNS DYNAMIC UPDATE TO MINIMIZE CLIENT-SERVER AND INCREMENTAL ZONE TRANSFER TRAFFIC (75) Inventors: Stuart Lup-Sing Kwan; Glenn Alexander Curtis, both of Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/157,756

(22) Filed: Sep. 21, 1998

(51) Int. Cl.⁷ ............................................. G06F 17/30
(52) U.S. Cl. ........................ 707/201; 707/203; 707/10
(58) Field of Search ................................ 707/201, 203, 707/10

(56) References Cited

U.S. PATENT DOCUMENTS

| 5,418,945 A | * | 5/1995 | Carter et al. ................ 395/600 |
| 5,550,981 A | * | 8/1996 | Bauer et al. ............ 395/200.96 |
| 5,721,907 A | * | 2/1998 | Pyne ............................ 707/10 |
| 5,745,906 A | * | 4/1998 | Squibb ........................ 707/203 |
| 5,806,078 A | * | 9/1998 | Hug et al. ................... 707/511 |
| 5,813,017 A | * | 9/1998 | Morris ........................ 707/204 |
| 5,832,520 A | * | 11/1998 | Miller ......................... 707/203 |
| 5,893,119 A | * | 4/1999 | Squibb ........................ 707/203 |
| 5,919,247 A | * | 7/1999 | Van Hoff et al. ............ 709/217 |
| 6,014,660 A | * | 1/2000 | Lim et al. ...................... 707/3 |
| 6,018,747 A | * | 1/2000 | Burns et al. ................ 707/203 |
| 6,101,507 A | * | 8/2000 | Cane et al. .................. 707/204 |
| 6,182,148 B1 | * | 1/2001 | Tout ............................. 709/245 |
| 6,199,065 B1 | * | 3/2001 | Kenyon ........................ 707/10 |

FOREIGN PATENT DOCUMENTS

| EP | 1001584 A2 | * | 6/2000 | ........... H04L/29/12 |
| WO | WO-00/01112-a1 | * | 6/2000 | ........... H04L/12/00 |

OTHER PUBLICATIONS

Elz, R, *Clarifications to the DNS Specification*, RFC 2181; pp. 1–14; Jul. 1997.

(List continued on next page.)

*Primary Examiner*—Paul R. Lintz
(74) *Attorney, Agent, or Firm*—Workman, Nydegger & Seel (57) ABSTRACT

The invention reduces network traffic between client computers and DNS server computers by allowing client computers to send information to DNS server computers that have implemented protocols RFC 2136 and RFC 1995. Network traffic is-minimized in DNS database updates between client computers and server computers by sending a small amount of data. The invention also minimizes the replication of DNS updates between DNS server computers in the face of protocol RFC1995 and defeats Windows Internet Naming System (WINS) referral by its ability to update DNS server computers that emulate WINS server computers and have WINS referral capabilities. Thus, when a client computer's data changes, updates to the DNS database are performed with the minimum number of activities so that the database reaches a desired state, where the minimum amount of data will replicate by sending the minimum content of data replication from one DNS server computer to another. Also, by allowing the client computer to publish DNS data into a DNS server computer's DNS database, and then by performing revisiting operations to assure that the published data is still correct, the inventive method permits neither DNS updates nor server-to-server replication to be performed if the client computer's published data is still correct. If the client data has changed, then the DNS database is updated with a minimal transfer of data between the client computer and the DNS server computer, and from thence from DNS server computer to DNS server computer.

26 Claims, 3 Drawing Sheets

OTHER PUBLICATIONS

Kessler, Gary, *Setting Up Your Own DNS*, pp. 1–10; http://www.hill.com/library/dns.html; Mar. 1996.

Mockapetris, P., *Domain Names—Concepts and Facilities*; RFC 1034; pp. 1–49; Nov. 1987.

Mockapetris, P., *Domain Names—Implementation and Specification*; RFC 1035; pp. 1–49; Nov. 1987.

Vixie, P., et al, *Dynamic Updates in the Domain Name System* (*DNS Update*); RFC 2136; pp. 1–24; Apr. 1997.

"*Windows NT Server: Dynamic Host Configuration Protocol and Windows Internet Naming Service*"; pp. 1–21; http://premium.microsoft.com/msdn/library/backgmd/html/msdn$_{13}$dhcpwins.htm; Aug. 19, 1994; Copyright 1998 Microsoft Corporation.

\* cited by examiner

METHOD AND COMPUTER READABLE MEDIUM FOR DNS DYNAMIC UPDATE TO MINIMIZE CLIENT-SERVER AND INCREMENTAL ZONE TRANSFER TRAFFIC

BACKGROUND OF THE INVENTION

1. The Field of the Invention

The present invention relates to computer networks and is more particularly related to a system for registration of data, such as Internet Protocol (IP) addresses, in compliance with a dynamic Domain Naming System (DNS) convention. The invention minimizes traffic between client computers and DNS server computers while minimizing incremental zone transfer network traffic between DNS server computers.

2. The Prior State of the Art

Increasingly, client computer-server computer computing has become a normal trend for the delivery of computational services. A server computer will have a desired application and a client computer will have software component capable of accessing the server computer for the desired services. This may take place over a communications network, such as an Ethernet Local Area Network ("LAN"), or it may occur over a more direct connection through a modem. In either case, the bulk of the computing is provided by the server computer or server computer application and the results are communicated to the client computer portion or client computer application that will then display the results for the user.

It becomes a somewhat difficult process in many instances to anticipate adequate resources for running the server computer application for a certain level of load created by a particular number of users desiring the services provided by the server computer application. The resources used are typically hardware resources, such as CPU time, network bandwidth, disk and memory usage, etc., but may also include software component resources, such as operating system facility usage.

It is important to anticipate adequate resources for the server computer application in order to reduce frustration on the part of the user and to allow the client computer-server computer software component to work most effectively. One of the most common user frustrations is having an unusually long delay in receiving the results of the services provided by the service application or simply not having the server computer application available to provide the desired services, both due to inadequate hardware and system resources. Furthermore, actual errors in the services provided may occur due to the lack of resources available for running the server computer application.

Increasingly, client computers and server computers are standardizing in the way that they communicate, particularly in view of the advances in use and exploitation of the Internet. Of the many areas of standardization, one example is in Internet machine addressing protocol, which is directed towards the reality that computers and people don't remember address information in the same way. While people remember address names with words, computers remember and store information, including address names, numerically. To help people and computers communicate, a translation program is need to translate address names expressed in words into address names expressed in numbers, and vice a versa. In order for a computer to find a specific resource on the Internet, such as a document, a Universal Resource Locator (URL) is used as the address for the document. A person wanting to locate the document enters the words of the URL on a computer that is in communication with the Internet. The computer identifies server computers, including itself, with an IP address that is numerically expressed.

The Microsoft Corporation has in the past produced computer networking software components that perform the registration of IP addresses using the Windows Internet Naming Service (WINS). WINS could be used to translate names expressed in words into names expressed in numbers, and vice a versa. In this way, WINS could be used to use to automatically publish machine name IP addresses. Translation software fundamentally is used to translate text names of server computers into the numeric names that computers recognize, which is then published as IP addresses so that server computers located on geographically disbursed computer networks, such as the Internet, can find one another.

The WINS server computer method is a method for automatic registration of machine host names and IP addresses that is handled through a WINS protocol and server computer. As a machine gets a new IP address, the address information is put on a WINS server computer. When the database of a WINS server computer is relatively small, the WINS server computer is relatively easy to use and maintain. The WINS server computer, however, is disadvantaged in that it does not scale very well since the namespace of the database thereof is flat and cannot be partitioned.

A more common server computer than a WINS server computer is a Domain Naming System (DNS) server computer. DNS is a general-purpose distributed database for storing of DNS data that is published by software entities. Although there are many uses for a DNS system and the general-purpose nature of the DNS database, such as its use as a mechanism for client-server rendezvous, one popular use is "name to address translation", or the act of converting human-friendly names into machine-friendly addresses. DNS is also used for address-to-name translation of the taking of an IP address and finding out the name associated with it. Computers and other resources having an Internet presence use DNS to provide a textually expressed name. In addition to the responsibility of DNS for converting machine names into IP addresses and vice versa, DNS also coordinates IP addressing in the vast and distributed database that is representative of all published machines.

WINS differs from standard DNS in two significant ways. Standard DNS information for a particular domain is configured through static configuration files. That is, the files must be updated by hand for the most part. The standard WINS information database is built dynamically without human intervention, although static records can also be added to the WINS database by manually entry. A WINS client computer will register its name with the WINS server computer when it boots. As long as the name is not already in use, the WINS server computer will allow the client computer to use that name.

WINS and DNS interface in a methodology knows as WINS Referral that functions on DNS server computers. In WINS Referral, queries are made by a client computer for a name and if the name is not found in the DNS database, then the query is referred instead to WINS. The WINS Referral methodology then determines if the queried name is in WINS or not. If the queried name is found in WINS, then the answer to the query is returned first back to DNS and then back to the client.

WINS and standard DNS are used to resolve different types of services. DNS is used to resolve service types like HTTP for web access, or FTP for file transfer, or POP for mail transfer, or TELNET for terminal access. WINS name resolution is used to resolve names of NETBIOS services. Some NETBIOS services include, for example, the ability to share directories and printers.

One of the many goals of DNS is to provide access to DNS data that is useable by computers connected on networks, called hosts. The terms host and client computer are used interchangeably herein. One example of this goal is the DNS mechanism for naming resources in such a way that the names are usable in different hosts, networks, protocol families, internets, and administrative organizations.

The DNS distributed general-purpose database is partitioned into zones. Each zone is hosted by a DNS server. In general, no single DNS server holds a copy of the entire DNS database. The database consists of records, where each record has five parts. The five parts of each DNS record are the Name, Time To Live, Class, Type, and Data. For the purposes of this present application, only the Name, the Type and the Data will be discussed. The Names in the DNS records form a hierarchy or tree. An example record type is the Host record, which is an "A record". The Name corresponds to the name of a host on the network, and the Data corresponds to the IP address of that host.

A record set consists of all the records for a given Name and Type. For example, the "A record set" for a given host name consists of all the IP addresses associated with that host, where there is one "A record" per IP address.

A DNS server may load one or more zones, and a DNS server that loads a zone is said to be Authoritative for the names in that zone. A zone may be copied to one or more servers for fault tolerance and load balancing. The act of replicating a zone from one server to another is called Zone Transfer. A single copy of the zone is identified as the Master copy of the zone, and all subsequent copies of the zone are Slave copies. Changes to the zone can only be made on the DNS server that holds the Master copy of the zone. There are some configurations, however, where there may be more than one Master copy of a given zone.

The "top" or beginning of a zone is indicated by a Start of Authority ("SOA record") record. The Name of the SOA record is the name of the zone. The Data of the SOA record includes the DNS name of the master server for the zone and a serial number value that indicates the current version of the zone. One or more Name Server ("NS record") records of the same Name always accompany an SOA record. The Data of the NS records includes the names of all the servers that are authoritative for the zone.

There are three major components of the DNS system including the Domain Name Space, Resource Records, Name servers, and Resolvers. The Domain Name Space and Resource Records are specifications for a tree structured name space and data associated with the names. Conceptually, each node and leaf of the Domain Name Space tree names a set of information, and query operations are attempts to extract specific types of information from a particular set of information. A query names the domain name of interest and describes the type of resource information that is desired. For example, the Internet uses some of its domain names to identify hosts. Queries for address resources return Internet host addresses. The Domain Name Space is a tree structure. Each node and leaf on the tree corresponds to a resource set. The domain name of a node is the list of the labels on the path from the node to the root of the tree. All domain names end at the root. A domain name has labels that are separated by dots ("."). A complete domain name ends with the root label. A domain is identified by a domain name, and consists of that part of the domain name space that is at or below the domain name which specifies the domain. A domain is a subdomain of another domain if it is contained within that domain. A domain name identifies a node. Each node has a set of resource information, which may be empty.

Name servers are server computer software components that hold information about the domain tree's structure and set information. Stated otherwise, name servers are the repositories of information that make up the domain database. As mentioned above, the DNS database is partitioned into zones, each of which is hosted by a DNS server computer. The zones are distributed among the name servers. The essential task of a name server is to answer queries using data in its zones. Name servers can answer queries in a simple manner. The response can always be generated using only local data, and either contains the answer to the question or a referral to other name servers "closer" to the desired information. Name servers manage data that is held in zones. Each zone is the complete database for a particular "pruned" subtree of the domain space. This data is called Authoritative. In contrast, a DNS server that loads the zone is said to be Authoritative for the names in that zone. A name server periodically checks to make sure that its zones are up to date, and if not, obtains a new copy of updated zones from master files stored locally or in another name server.

Figure 1:
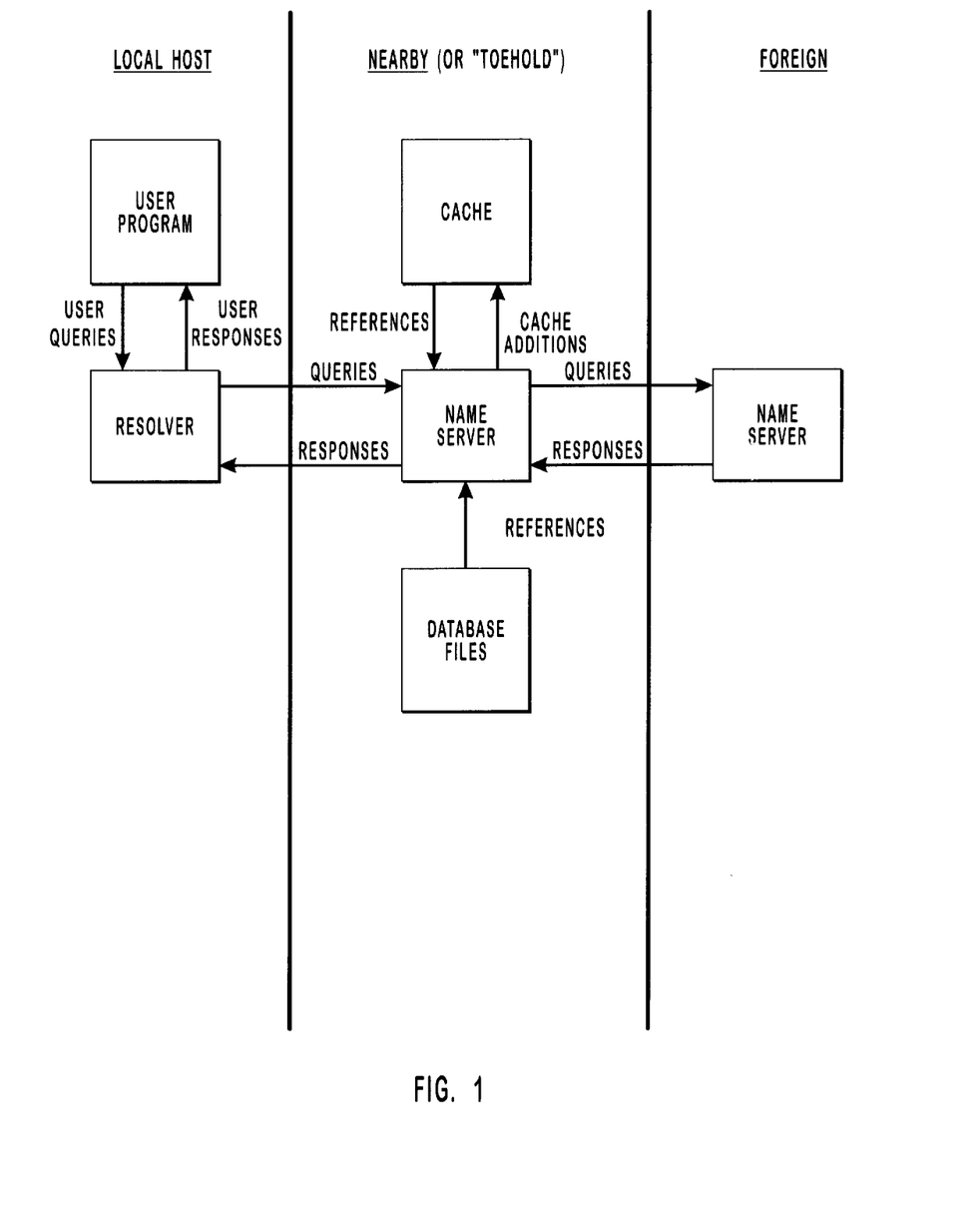
FIG. 1 is a block diagram showing the environment and interfacing of a common DNS configuration as existing in the prior art in which user programs interact with the domain name space through a resolver in the domain name system, where a cache holds domain space data for a nearby or "toehold" local name server and its local resolver.

A host can participate in the domain name system in a number of ways, depending on whether the host runs programs that retrieve information from the domain system, name servers that answer queries from other hosts, or various combinations of both functions. A common DNS configuration is seen in FIG. 1 in which user programs interact with the domain name space through resolvers. From the user's point of view, domain names are useful as arguments to a local agent, which called a resolver, which retrieves information associated with the domain name. Thus a user might ask for the host address by an appropriate query type that is then passed to the resolver with the domain name. To the user, the domain tree is a single information space.

The information flow shown in FIG. 1 illustrates a host supporting various aspects of the domain name system, where a cache holds domain space data for the nearby or "toehold" name server and the local resolver. As is illustrated in FIG. 1, the DNS system is constructed of three parts: a resolver, a "toehold" DNS server, and one or more foreign DNS servers. The resolver associated with a local host store the IP addresses of one or more "toehold" DNS servers, where typically the toehold server is nearby in a communications network or physical sense. The resolver then send queries to the toehold server for which the resolver has an IP address, and the toehold servers answers the query from its authoritative data, or out of its associated cache, or by recursively querying one or more foreign servers for an answer to the query. The contents of the cache will typically be a mixture of authoritative data maintained by the periodic refresh operations of the name server from previous resolver requests. The structure of the domain data and the necessity for synchronization between name servers and resolvers imply the general-characteristics of the cache.

The format of user queries and user responses is specific to the host and its operating system. User queries will typically be operating system calls, and the resolver will be part of the host operating system. Less capable hosts may choose to implement the resolver as a software component subroutine to be linked in with every software component that needs its services.

A local resolver, which is illustrated by way of example in FIG. 1, is a software component that extracts information from name servers in response to client computer requests. A resolver must be able to access at least one name server and use that name server's information to answer a query directly, or pursue the query using referrals to other name servers. From the resolver's point of view, the database that makes up the domain space is distributed among various name servers. The resolver starts with knowledge of at least one name server. When the resolver processes a user query it asks a known name server for the information. In return, the resolver either receives the desired information or a referral to another name server.

Resolvers answer user queries with information they acquire via queries to foreign name servers. The resolver may have to make several queries to several different foreign name servers to answer a particular user query, and hence the resolution of a user query may involve several network accesses and an arbitrary amount of time. The queries to foreign name servers and the corresponding responses have a DNS standard format.

Depending on its capabilities, a name server could be a stand alone program on a dedicated machine or a process or processes on a large timeshared host. As seen in FIG. 1, a primary name server acquires information about one or more zones by reading zone files from its local file system, and answers queries about those zones that arrive from foreign resolvers.

The DNS allows that zones be redundantly supported by more than one name server. Designated secondary servers can acquire zones and check for updates from the primary server using the zone transfer protocol of the DNS. In FIG. 1, the name server periodically establishes a virtual circuit to a foreign name server to acquire a copy of a zone or to check that an existing copy has not changed. The messages sent by messaging for these maintenance activities follow the same form as queries and responses, but the message sequences are somewhat different.

In general, a network administrator is charged with maintaining a database. In the task of manually maintaining a zone by a network administrator, part of the job is to maintain the zones at all of the name servers which are authoritative for the zone. When the inevitable changes are made, they must be distributed to all of the name servers. Stated otherwise, a change must be distributed to all servers that load the zone affected by the change.

The general model of automatic zone transfer or refreshing is that one of the name servers is the master or primary for the zone. Changes are coordinated at the primary name server, typically by editing a master file for the zone. After editing, the administrator signals the master server computer to load the new zone. The other non-master or secondary server computers for the zone periodically check for changes, at a selectable interval, and obtain new zone copies when changes have been made.

To detect changes, secondary servers just check a serial number of the SOA for the zone. The serial number in the SOA of the zone is always advanced whenever any change is made to the zone. The purpose is to make it possible to determine which of two copies of a zone is more recent by comparing serial numbers. If the serial field in the secondary server's zone copy is equal to the serial returned by the primary, then no changes have occurred. When the poll shows that the zone has changed, then the secondary server computer must request a zone transfer via a request for the zone. The request is answered by a sequence of response messages. The first and last messages must contain the data for the top authoritative node of the zone. Intermediate messages carry all of the other record sets from the zone, including both authoritative and non-authoritative record sets. The stream of messages allows the secondary server computer to construct a copy of the zone.

In DNS, a given name server will typically support one or more zones, but this gives it authoritative information about only a small section of the domain tree. The name server marks its responses to queries so that the requester can tell whether the response comes from authoritative data or not. A particular name server has complete information about a subset of the domain space, and pointers to other name servers that can be used to lead to information from any part of the domain tree. Name servers know the parts of the domain tree for which they have complete information. From a name server's point of view, the domain system consists of zones that are separate sets of local information. The name server has local copies of some of the zones. The name server must periodically refresh its zones from master copies in local files or foreign name servers. The name server must concurrently process queries that arrive from resolvers.

The authoritative server computers for a zone are enumerated in the NS records for the origin of the zone, which, along with a SOA record are the mandatory records in every zone. Such a server computer is authoritative for all resource records in a zone that are not in another zone. A server computer for a zone should not return authoritative answers for queries related to names in another zone unless it also happens to be a server computer for the other zone.

DNS has been designed such that a consistent name space is used for referring to resources. All DNS data associated with a name is tagged with a type and queries can be limited to a single type or can be directed to retrieve all types for a given name. Query operations, as discussed above, are initiated by queries. Queries are messages which may be sent by messaging to a name server to provoke a response. The response by the name server either answers the question posed in the query, refers the requester to another set of name servers, or signals some error condition.

Traditionally, records in a DNS database of a DNS server computer were manually configured through editing of zone files. Then, the Zone Transfer mechanism was used to replicate zones between server computers. As such, entry of data could be at only one location. This type of manual entry is generally too intense in that DNS data that changes often is hard to manage and inefficient because it involved editing a file directly and reloading the server. A more efficient method would involve a method in the protocol itself for dynamically updating the database. Of the many examples of data in a DNS database that can be published dynamically, one example is IP addresses in the DNS database.

As used herein, the term "RFC 1034" refers to the Network Working Group Request For Comments No. 1034 titled "Domain Names—Concepts and Facilities", published by Information Sciences Institute (ISI) of the University of Southern California in November, 1987, which is incorporated herein by reference.

As used herein, the term "RFC 1035" refers to the Network Working Group Request For Comments No: 1035 titled "Domain Names—Implementation and Specification" published by published by Information Sciences Institute (ISI) of the University of Southern California in November, 1987, which is incorporated herein by reference.

As used herein, the term "RFC 1995" refers to the Network Working Group Request For Comments No. 1995 titled "Incremental Zone Transfer" authored by M. Ohta of the Tokyo Institute of Technology and published in August 1996, which is incorporated herein by reference.

As used herein, the term "RFC 2136" refers to the Network Working Group Request For Comments No. 2136 titled "Dynamic Updates in the Domain Name System (DNS UPDATE)", category: Standards Track, edited by P. Vixie, and authored by S. Thomson, Y. Rekhter, and J. Bound, and published in April, 1997, which is incorporated herein by reference.

Internet Protocols RFCs 1034 and 1035, as modified by RFC 2136, indicate a way in which DNS entries can be updated dynamically. The Internet Protocol RFC 2136 describes an on-the-wire protocol for being able to send updates to a particular server computer. Using RFC 2136, it is possible to add or delete data from a specified zone, such as IP address records. In RFC 2136, messages can be transmitted in messaging routine, such as an update message. Some messages can have prerequisites while other messages need not have prerequisites. When an update message does contain a prerequisite, an update is not made to a zone until the prerequisite is first met, i.e., all prerequisites must be satisfied or else no update operations will take place. A prerequisite is a messaging component that is sent from a client computer to another server computer that does not contain an update to the zone, but rather examines a record or record set of any type whose name falls within the zone. One such examination of the prerequisite component is that of the IP address records held by the server computer. The prerequisite can ask the previous existence or non-existence within the server computer's database of one or more names or record sets.

In network communications, it is desirable to decrease use of bandwidth, lower network traffic, and thereby potentially increase responsiveness. Dynamic updates can cause excessive zone transfers which are an inefficient use of bandwidth. In the past, changes to the DNS database were made using a full zone transfer mechanism in which the entire zone file would be replaced if any or the entire zone had changed. When two server computers communicate, they replicate the entire zone if any portion of a zone is different.

Traditional DNS replication transfers an entire zone of record sets from one server computer to another even if only one record is changed. As such, many record sets in a zone are replicated from server computer to server computer whenever the smallest portion of a record within the zone changes. Full zone transfer of replication data generates a large amount of network communications traffic.

In full zone transfer, a first server computer has a set of records that a are bundled together in a zone and a second server computer has a copy of the zone. Periodically, the first server computer examines a serial number of the zone on the first server computer that is indicative of the version of that zone. The purpose of the examination is to make sure that the first server computer has a zone with an up to date version number. If the second server computer has a version number is smaller than the first server's version number, as is indicated by a serial of the zone of the second computer, then the second server computer initiates a copy of the entire zone from the first server computer to the second server computer.

To make changes to the DNS database more efficient, Incremental Zone Transfer was specified in RFC 1995. RFC 1995 proposes a more efficient mechanism, as it transfers only the changed portion(s) of a zone between DNS servers. RFC 1995 is helpful to minimize the traffic between server computers. If a first server computer,-which likely has an older version of a zone, thinks it needs new information about the zone, it sends a message to a second server computer containing it an age representation code of its, presumably outdated, copy of the zone. The second server computer receives the request with the outdated aging code, and therefore then knows to send back to the first server computer an update containing each change to the zone that second server computer has that the first server computer does not have. As such, the second server computer sends to the first server computer only those changes that are required to make the first server computer's version of the zone current.

In Incremental Zone Transfer, a secondary name server requests an Incremental Zone Transfer and a primary or secondary name server responds to the request. As such, RFC 1995 implements Incremental Zone Transfer as a DNS server computer-to-DNS server computer mechanism to replicate DNS database information. As specified in RFC 1995, an one server sends an IXFR message containing the SOA serial number of its copy of a zone to another server. When an IXFR request with an older version number is received, the next IXFR server computer needs to send only the differences required to make the first server's version current. If, however, an IXFR query with the same or newer version number than that of the next server computer is received, it is indicative that the next server computer does not have a newer version than the first server, and that there is no need for an update to the first server computer's DNS database. From this, it can be seen that the DNS update mechanism of RFC 1995 makes server computer-to-server computer DNS database updates more efficient than full zone transfers by transferring only portions of a zone that are needed to update the DNS database instead of a full zone data transfer.

While protocol RFC 1995 has reduced network traffic in communications between DNS server computers, it does not reduce communications between client computers and DNS server computers. Accordingly, there is a need to address the ubiquitous problem of client computer-server computer network traffic.

SUMMARY OF THE INVENTION

The inventive method reduces communications network traffic between a client computer and a DNS server computer, as well as between DNS servers. The requirements of Internet Protocols RFCs 1034, 1035, 1995, and 2136 are appropriated by the inventive method so as to realize the inherent benefits of interoperability with other networks similarly in compliance with these DNS protocols. The invention demonstrates a particular usage of protocol RFC 2136 that minimizes the amount of client to server traffic for dynamic update, while also minimizing the amount of corresponding RFC 1995 incremental zone transfer traffic.

The invention presents an Application Program Interface where a calling software entity indicates what it believes is the current state of a record set in the DNS database, and what it wants the final state of the record set to be after the call is complete. The method described in the invention then attempts to change the state of the database to the desired state while maintaining database consistency. If the current state of the database is different and conflicting with the calling software entity's version of the current state, then the database is left unchanged and the calling software entity is notified. This prevents two unique callers from perpetually resetting the contents of a single record set.

During each update, the inventive method uses the dynamic update semantics in accordance with RFC 2136 where possible, in order to defeat systems where a passthrough to another database makes DNS appear to have authoritative data published when it in fact DNS does not have authoritative data published. An example of such a passthrough mechanism is the WINS Referral, discussed above, which is found on a number of DNS server implementations.

A practical implementation of the foregoing is the process of a host that periodically monitors DNS data maintained in a DNS database stored by a DNS server. This monitoring is simplified by a DNS formatted message that is transmitted by a messaging routine from the host to the DNS server. The transmitted record preferably incorporates a minimum amount of data so as to make a prerequisite comparison of the client data stored by the DNS server to that stored by the host. If there is a match, then the inventive method permits no update to the DNS server and the inventive method calls for no server computer-to-server computer replication of the client data. If the DNS server reports to the host that there is no match, then the host transmits another DNS formatted message requesting the client data stored by the DNS server. The DNS server then transmits the client data back to the host. The host then determines the minimum changes that can be made to that received data so that a match will be made to the client data stored by the host. Those minimum data are placed in one ore more DNS formatted messages and transmitted over the network to the DNS server computer for the update to its client data.

After the client data stored by the DNS server has been updated to match the client data stored by the host, the DNS server then replicates the changes to other DNS servers by transmitting only the minimum changes in accordance with RFC 1995. As such, server-to-server traffic is minimized. By using Internet community protocols, the invention provides to a large and diverse group of networked entities using the DNS database a worldwide and interoperable system that minimizes network traffic.

These and other features of the present invention will become more fully apparent from the following description and obtained by means of the instruments and combinations particularly pointed out in the appended claims, or may be learned by the practice of the invention as set forth hereinafter.

BRIEF DESCRIPTION OF THE DRAWINGS

In order that the manner in which the above recited and other advantages of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

As used herein, the term "software component" refers to any set of executable instructions separately cognisable to an operating system that manages a computer system. Examples would include separate processes or threads, application programs, system device s drivers, and any other such operating system entity.

As used herein, the term "communications network" is to be interpreted broadly and includes, but is not limited to, local area networks, telecommunications networks, wide area networks, modem connections, etc. Typically, a communications network will comprise a physical component or physical connection that is made up of the wiring, interface cards and other hardware combined with a specified communications protocol to transmit information from one physical connection to another.

As used herein, the term "Application Programming Interface"(API) is a set of subroutines provided by one software component so that relevant services may be uniformly accessed.

As used herein, the term "messaging" refers to sending uniform message blocks between software components in order to communicate therebetween. One example would be the I/O Request Packet (IRP) structure used in the Windows NT brand I/O system to communicate between different drivers.

FIG. 1 with the foregoing and the following discussions are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 2:
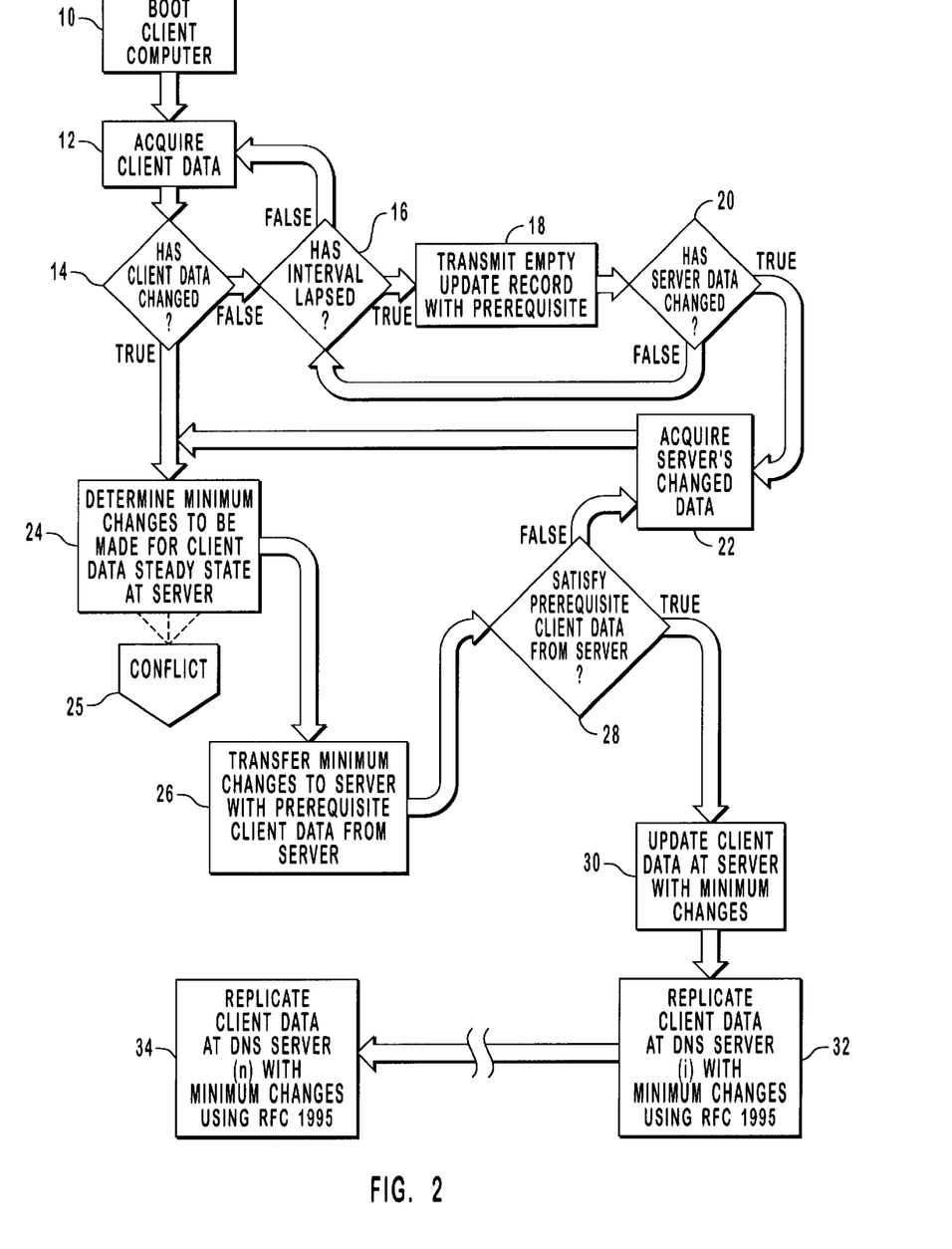
FIG. 2 is a flow chart showing the processing steps taken by a client computer according to the inventive method in which a minimum data is transferred from the client computer to a DNS server computer so as to replicate the client's data in the database of the DNS server computer, and then further replicated in other DNS servers.

One example of a preferred embodiment of how the inventive method minimizes client-server network traffic and server-server replication net traffic is illustrated in the flowchart seen in FIG. 2. Step 10 in FIG. 2 depicts the initial program loading or "boot" of a client computer that is connected to one or more networks, also referred to herein as a host. While Step 10 depicts the boot of a host, it is also intended to represent those circumstances in which a change in client data of a host can be effected, such as a change of its name, IP address, or other records.

When a host is turned off and then turned back on, usually its client data, such as its IP address, will be unchanged. Nevertheless, in this circumstance as well as other circumstances represented by Step 10, the host may have changed client data that should be published. When so published, other machines on the one or more networks to which the host is connected can access the published information.

Step 12 indicates that the host or client computer acquires client data, such as an Internet Protocol (IP) address of the host. The client data can be acquired by various API, in circumstances such as when the client computer comes into a new communications network or is simply turned back on after being turned off. In a dynamic system of assigning IP addresses, the potential for the acquisition of a new and different client data becomes significant.

Once the client data has been acquired, the client computer determines at Step 14 whether the client data has changed. If so, control in the inventive process passes on to Step 24 and if not, control passes to Step 16.

In Step 16 the client computer is permitted to proceed only if a time period has expired. In the event that the time period is unexpired, the method returns to Step 12 and will not pass on to Step 16 until the predetermined time period has passed.

Once the time period has expired, control passes to Step 18. In Step 18, the client computer uses various API to send a RFC 2136-formatted record by a messaging routine to the server computer. As defined in RFC 2136, RFC 2136-formatted records have five sections which are Header, Zone, Prerequisite, Update, and Additional Data. For the purposes of the present application, the Prerequisite and Update sections are the focus of the inventive method. The Update section details procedures to be performed at the server computer. Unless the prerequisite conditions in section one are met, the procedures specified in Update section are not performed by the server. In the case of Step 18, the Update section is empty and does not contain any instructions for the server to perform. In the Prerequisite section, the prerequisite states the status of the client data and requests whether the server computer has the same copy of the client data.

In Step 20 the client data, as specified in the prerequisite of the transmitted record to the server computer, is compared to the client data held by the server to determine whether or not the client data held by the server is the same as the client data held by the client. If these two data are the same, then the system is considered to be in a "steady state" and control returns to Step 16, described above, for the recycling of the steady state inquiry until such time as another time period has lapsed.

If the host finds, in Step 20, that data held by the server is other than as expected, then control passes on to Step 22 in which the client computer transmits record by a messaging routine to the server computer having an RFC 1035-formatted message query requesting the server computer to send back to the host the content of the client data that is held by the server. Upon receipt of the client data held by the server at the host, control passes to Step 24.

In Step 24 a determination is made as to what must be added and what must be deleted from the client data held by the server so as to transform that data into the same client data that is held by the client computer. It is the goal of this determination to set forth only the minimum changes that need to be made to make this transformation. As such, no data will be deleted that need not be deleted and no data will be added that need not be added. In the event that the server computer has data that is missing from the client computer, the data missing from the client computer can not be over written by the client computer in an attempt to update the server computer to a state that the client computer desires. As such, the missing data causes a conflict to result as is indicated at Step 25. In a conflict situation, the database held by the server computer can not be updated by the data held by the client computer. The database of the server computer is thus deemed to be unrepairable. At Step 25, the inventive method returns a message of a conflict to the client computer.

If no conflict exists, a transmission record is assembled for transmission from the client computer to the server computer at Step 26. The transmission record includes the minimum additions and deletions necessary to effect the transformation of the client data held by the server and a set of prerequisites that reflects the state of data at the server computer that the client computer acquired from the server computer at Step 22. These prerequisites are necessary in order to ensure that the database at the server computer moves from exactly the state the client computer believed it was in to exactly the state the client computer wants the database in after said minimum additions and deletions. As such, consistency is preserved.

In Step 26, the DNS record holding the minimum changes is transmitted by a messaging routine from the client computer to the server computer. A check is performed at Step 28 to verify that the set of prerequisites have been satisfied. The set of prerequisites have been satisfied when the data held by the server is as the client computer expects it to be. If not, the inventive method returns to Step 22, described above.

Assuming that there has been a satisfaction of prerequisites at Step 28, the inventive method proceeds to Step 30 where the minimum data received in the record sent by the client computer to the server computer is processed so as to update the client data held by the server. At this point, the client computer and the server computer have been placed back into the "steady state". Then, control passes to Step 32 in which the DNS server begins to replicate the steady state into other DNS servers. In the replication process, prior updates that have been received by a DNS Server (n–1) are compared to those received by a DNS Server (n). Each of those updates that have not be so received by DNS Server (n) are then transmitted to DNS Server (n) by DNS Server (n–1) so as to replicate the DNS database. In so replicating other servers, only the minimum data is passed from server to server so as to minimize the use of bandwidth and to minimize the network traffic in a communications network required in the client data replication process.

As seen in Steps 32 and 34, replication of the steady state of client data progresses from DNS server "i" through DNS server "n". Servers i through n may be located on the same network or different networks, including the Internet.

It should be noted that the inventive method does much to minimize network traffic in the determination of the steady state between the client computer and the server computer. As seen in Step 18 an empty update prerequisite record minimum data is passed from the client computer to the server computer and need only make one trip to the server and back to the client computer in order to ascertain that the steady state of the client data has not changed. As such, the minimum amount of data and only one round-trip "on-thewire" between client computer and server computer are necessary to ascertain a steady state condition. As seen in Step 26 only the minimum data necessary to transform client data held by the server into client data held by the client was transmitted over the network to place the server back into a steady state condition. As such, the inventive method reduces bandwidth used and minimizes network traffic in the update to the server. A minimization effort is seen in client data replication between servers in Steps 32 and 34 of FIG. 2.

Figure 3:
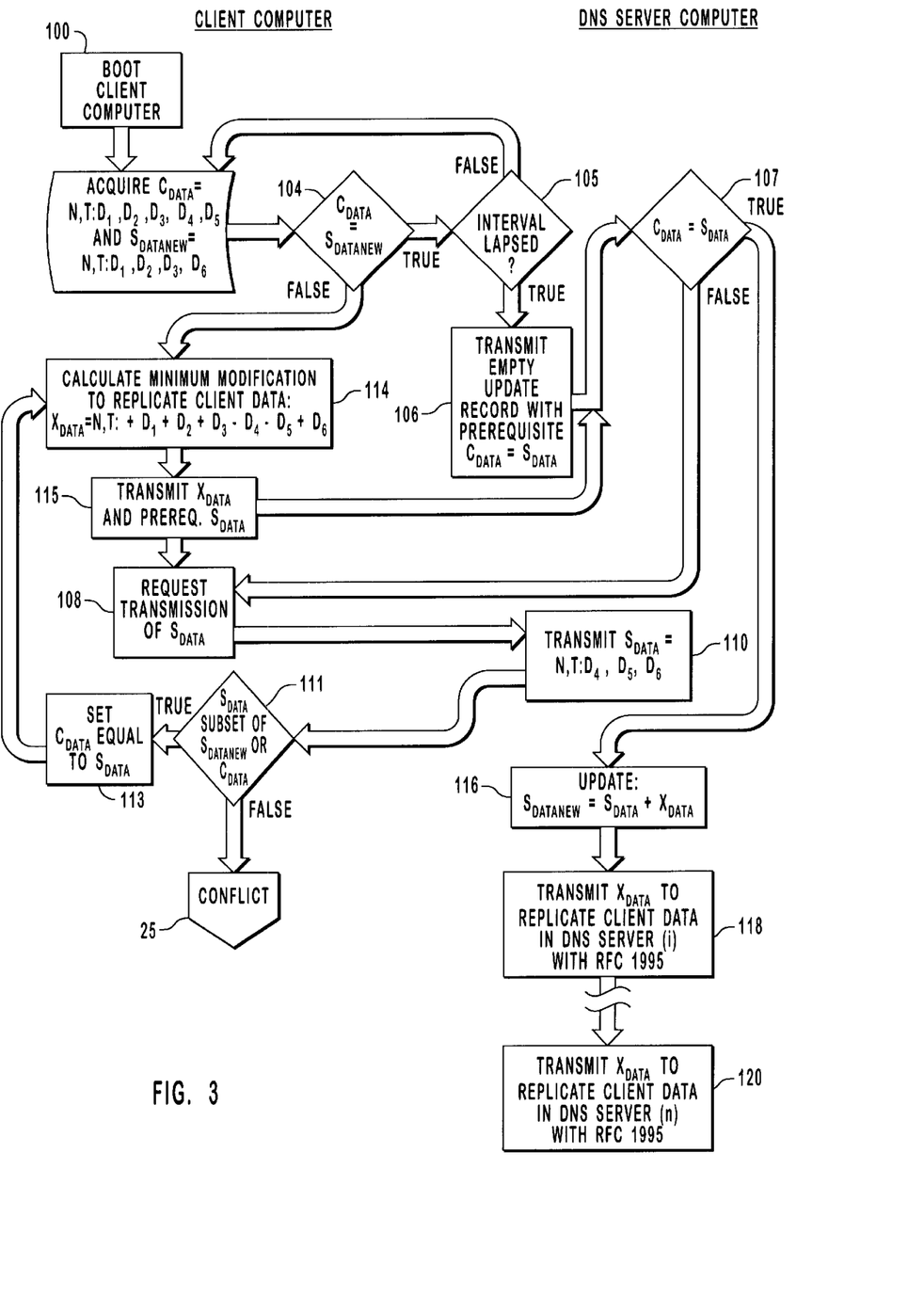
FIG. 3 is a flow chart depicting the flow of data in the processing steps taken by a client computer according to the inventive method in which a minimum data is transferred from the client computer to a DNS server computer so as to replicate the client's data in the database of the DNS server computer, and then further replicated in other DNS servers.

FIG. 3 illustrates the flow of data between a client computer and one or more DNS servers in the ascertaining of the steady state of client data between a client and a server and subsequent replication of the steady state to other servers. In FIG. 3, a host is put through a boot process at which time client data is acquired in Step 102. Like Step 12 in FIG. 2, Step 100 in FIG. 3 is intended to represent circumstances in which a change in client data of a host can be effected, such as a change of its name, IP address, or other records. At Step 102, the client data that is acquired is $C_{data}$ which is in the format of "N,T:D1, $D_2$, $D_3$, $D_4$, $D_5$", where "N" is the name or owner of the record which specifies a domain where the data record is found, "T" is the type of data that is included in $C_{data}$, and record set $D_1$ through $D_5$ includes records $D_1$, $D_2$, $D_3$, $D_4$, and $D_5$. Additionally, the client computer acquires $S_{datanew}$ which is the state of the client data that the client computer would like the server computer to have. $S_{datanew}$ is in the same format as $C_{data}$, but has a different set of records including $D_1$, $D_2$, $D_3$, and $D_6$.

Control passes from Step 102 to Step 104 where the $S_{datanew}$ is compared to $C_{data}$. If these are different the steady state has been broken, such as through the turning off and the turning on again of the client computer followed by a change in client data or client data, the indication of which can be a server computer returns a "false" success code to the client computer. When there has been a change to the data in the client computer, control passes to Step 114. If there is no difference, control passes to Step 105.

In Step 105, a counter or incrementing device is consulted to determine whether or not it is time to monitor the steady state of client data held by a server. If the interval has not lapsed, then the steady state is not ready to be monitored and there is continuation of the counting of the steady state monitoring interval by returning control to Step 102 from Step 105. If the interval has lapsed, then a DNS formatted message is assembled by the client computer for transmission to an associated DNS server computer as is represented by Step 106.

At Step 106, the DNS formatted message is a transmission record having a prerequisite section that contains both $C_{data}$ and $S_{datanew}$ and is received by the associated DNS server computer. Procedures to be implemented in the server computer are not found in the transmission record, but rather only the prerequisite section of the transmission record has data therein. As such, the transmission record is a "empty update" record. The empty update record, which contains only minimal data, serves the purpose of ascertaining whether or not a steady state exists between the client computer and server computer while minimizing network traffic.

At Step 107, the prerequisite section is first examined to see if the client data held by the client computer, $C_{data}$, is equal to the client data held by the server computer, $S_{data}$. If so, control goes to Step 116 and if not, control goes to Step 108.

At Step 108 the process of restoring a steady state begins, in that the client data held by DNS servers must be updated.

In step 108, a record having a DNS-formatted message is sent from the client computer to the server computer containing a request that the server computer transmit back to the client computer the contents of the client data held by the server, $S_{data}$. In Step 110, a DNS message format record is sent from the server to the client computer containing the server's version of the clients data, $S_{data}$. Step 110 indicates that the contents of $S_{data}$ shows that the owner is "N", the type of the record is "T", and that the record set held by Sdata include records $D_4$, $D_5$, and $D_6$. As such it is apparent that $C_{data}$ differs from $S_{datanew}$, which is the desired state of the client data held by the server computer.

At Step 111, an examination is made to see if the client data held by the server computer, $S_{data}$, is a subset of either $C_{data}$ or $S_{datanew}$. $S_{data}$ will be a subset of these if it holds only data that is held by either $C_{data}$ or $S_{datanew}$. If $S_{data}$ is not a subset, a conflict results and control passes to Step 112. Step 112 returns control to the client computer with a diagnostic representative of a conflict and unrepairability of the database of the server computer. In the event that $S_{data}$ is a subset of either $C_{data}$ or $S_{datanew}$, then control passes on to Step 113 where $C_{data}$ is set equal to $S_{data}$. Then, control in the inventive method passes on to Step 114.

In Step 114, the client computer determines the minimum modifications that can be made to $S_{data}$ to transform the same into $S_{datanew}$. In this case, this transformation requires the removal of records $D_4$, $D_5$, and the addition of records $D_1$, $D_2$, $D_3$, and $D_6$. These deletions and additions are placed into a DNS message format record "$X_{data}$" having name or owner "N" and record type "T" with data that gives instructions to alter $S_{data}$ by removing records $D_4$, $D_5$ and adding records $D_1$, $D_2$, $D_3$, and $D_6$. Also, a prerequisite section of the DNS message format record includes $S_{data}$.

In Step 115, the DNS message format record containing $X_{data}$ with a prerequisite section containing $S_{data}$ is transmitted from the client computer to the DNS server computer. In this transmission, only the minimum data that needs to be transmitted from the client computer to the server computer is transmitted. As such, only the minimum increase in network traffic is experienced by this transmission. Control is passed on to Step 107 as described above.

Step 116, the client data maintained by the server computer is updated with respect to $X_{data}$. This is accomplished by removing records $D_4$, $D_5$ and adding records $D_1$, $D_2$, $D_3$, and $D_6$. In so doing, a new version of client data is then maintained by the server. As such, $S_{data}$ is in steady state with the client data held by the client computer, $C_{data}$.

Following establishment of the steady state between the client computer and the server computer, Steps 118 through 120 are performed in accordance with the Internet Protocol RFC 1995. Step 118 involves the assembly of a DNS formatted message the DNS server computer that contains the replication data, $X_{data}$, for the purpose of transmission of the same to a DNS server computer (i). Upon receipt of $X_{data}$ by DNS server computer (i), client data contained by DNS server computer (i) is updated so as to be in steady state with the of the DNS server computer.

Following Step 118, each DNS server computer (i+1) through DNS server computer (n) is replicated as to minimized data $X_{data}$ so as to reach a steady state with the client data held by the client computer. In each of the replications of the minimum data, $X_{data}$, from DNS server (i) to DNS server (n), the internet protocol RFC1995, Incremental Zone Transfer, is observed so as to permit interoperability in the client data replication between DNS servers, while realizing the inherent benefits of reduced network traffic through the use of Internet protocol RFC1995.

The DNS message format for data transmitted under the DNS system includes a header section specifying the type of message that is being sent. For instance, in dynamic update, as specified in RFC2136, the message is an "UPDATE". The header section also describes the size of other sections. The DNS message format includes a zone section that names the zone that is to be updated by the message. The DNS message format also includes a Prerequisite Section that specifies conditions and terms of the zone content that are required before an update is made. The DNS message format contains an update section that contains the edits to be made in the updating of data. Step 18 of FIG. 2 and Steps 106 of FIG. 3 depict situations in which the Prerequisite Section contains the condition of the zone specifying client data and requests whether the server contains the same client data. The update section, however, contains no edits to be made. As such, the DNS message format record is considered a "empty update" in that no instructions for edits to be made are contained in the record. In this way, the empty update record carries the minimum amount of data to determine the steady state of client data maintained by the server. As such, both network traffic and bandwidth use is minimized by this minimization of data transmitted in the determination of a steady state between a client and server.

Once it has been determined that there is not a steady state between a client and server, then the inventive method requires that the client update the DNS server. To do so, the inventive method features two transactions for DNS update, which are "add record set" and "modify record set". The whole record set update that is transferred from a client computer to a DNS server computer contains only that which is to be added and that which is to be removed so that the client computer's IP address data in the DNS database will is properly published. The whole record set update is then used to update the DNS database in the DNS server computer into a properly published state.

The inventive method does not specifically minimize the replication traffic in the face of full zone transfer, but does do so using protocol RFC 1995 by sending the minimum whole record set update to the DNS slave server computers that are participating in DNS database replication. For example, if there is only one record in the whole record set that is updated, a DNS slave server computer will receive only one record in the replication from a corresponding master server computer. If there are five records in the whole record set that are updated, then the DNS slave server computer would be updated as to only five records from the master server computer. As such, the inventive method leverages the advantages of RFC 1995 by sending only the minimal amount of changes that are needed to place the DNS database of the DNS server computer into a properly published state.

In addressing the client computer-server computer network traffic problem, the inventive method allows client computers to send information, via various APIs, to DNS server computers that have implemented RFCs 1034, 1035, 2136 and 1995. Network traffic between DNS server computers is minimized, at least in part, by protocol RFC 1995 which is limited to partial zone transfers for DNS database updates between DNS server computers. The invention teaches manipulating DNS database records sets to provide client computer data updates from client computers to DNS server computers. In so doing, the inventive method minimizes the replication of DNS updates between DNS server computers in the face of protocol RFC1995 since smaller update replications are passed on from server computer to server computer in the client data replication process.

In the inventive method, a DNS database in a DNS server computer is updated by the registration of DNS data records using dynamic update semantics in accordance with RFC 2136, where possible. Since protocol RFC 2136 is an Internet standard, updates can be sent to DNS server computers from any client computer or DNS server computer that incorporates the RFC 2136 protocol.

In addition to the foregoing, the invention also defeats passthroughs to other database maintenance systems. The inventive method defeats such passthroughs by causing a DNS database appear to have authoritative data published when it does not have authoritative data published. An example of a defeated passthrough is the WINS Referral methodology discussed above. The process by which the invention defeats WINS Referral occurs when a client computer queries a DNS server computer to determine if there is a steady state condition indicating that the client computer's records have been registered in the DNS database. If the DNS server computer determines that a steady state does not exist, then the DNS server computer determines if the client computer's records have been registered in the WINS database. Once the client computer's records are found to have been registered in the WINS database, the DNS server then sends an answer back to the client computer from the WINS database. In response to the answer, the client computer is satisfied that its records are published in the DNS database and a steady state condition exists. In operation, the inventive method uses the client computer's prerequisite check of the steady state condition to insure that the DNS server computer interprets the client computer prerequisite check request as an update request instead of as a query. The DNS server, upon receiving an update request, will thus not perform the WINS Referral methodology. As such, the inventive method defeats WINS Referral.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a network including a client computer and a first server computer, a method comprising the steps of:

comparing a first data set stored by the client computer to a second data set stored by the first server computer; and:

if a difference exists, then performing a primary modification procedure including the steps of:

identifying a third data set consisting of the minimum additions and deletions to the second data set so as to eliminate the difference;

using said third data set to eliminate the difference from the second data set stored by the first server computer;

if a difference does not exist, then periodically repeating the comparing step until said difference exists, then performing said primary modification procedure, wherein comparing the first data set stored by the client computer to the second data set stored by the first server computer includes transmitting by messaging a DNS formatted message from the client computer to the first server computer, the DNS formatted message having a prerequisite section for containing a prerequisite condition and an update instructions section for containing update instructions.

2. The method as defined in claim 1, wherein the network includes a second server computer and said difference does not exist, the method further comprising:

performing said primary modification procedure one or more times, said first server computer receiving and storing said third data set from said client computer for each said primary modification procedure performed, said second server computer having stored therein one or more of said third data sets previously received from said first server computer;

transmitting from the first server computer to the second server computer each said third data set that is stored by first server computer and that is not stored by the second server computer, said second server computer receiving and storing each said third data set that is so transmitted by said first server computer.

3. The method as defined in claim 1, wherein the network includes a second server computer and said difference does not exist, the method further comprising:

performing said primary modification procedure one or more times, said first server computer receiving and storing said third data set from said client computer for each said primary modification procedure performed, said first server computer storing a first data element representative of the number of said third data sets so stored, the second server computer receiving and storing one or more of said third data sets from said first server computer, said second server computer also storing a second data element representative of the number of said third data sets stored by said second server computer;

performing a secondary comparison operation including the steps of:

comparing the first data element to a second data element;

producing a true condition when the first data element equals the second data element;

producing a false condition when the first data element equals the second data element;

when a false condition exists from said secondary comparison operation, then performing a secondary modification procedure including:

transmitting from said first server computer each of said third data sets that the first server computer has stored and that the second server computer has not stored;

receiving and storing at said second server computer from said first server computer each of said third data sets that the first server computer has stored that the second server computer has not stored, said second server computer storing a new second data representative of the number of said third data sets stored by said second server computer such that said new second data element is equal to said first data element;

when a true condition exists from said secondary comparison operation, periodically repeating said secondary comparison operation until a false condition is produced thereby, then performing said secondary modification procedure.

4. The method as defined in claim 2, wherein:

the first server computer and the second server computer are both DNS server computers;

using said third data set to eliminate the difference from the second data set stored by the first server computer includes transmitting a DNS formatted message containing the third data set to the first client computer.

5. In a system including a client computer in a communications network with a first server computer, wherein client data is stored in a memory of the client computer and client data is stored in a memory of the first server computer, a method comprising the steps of:

comparing the client data stored by the client computer to the client data stored by the first server computer; and:

if a difference exists, then performing a primary modification procedure including the steps of:

identifying a first data set of the minimum additions and deletions to the client data stored by the first server computer so as to eliminate the difference;

using said first data set to eliminate the difference from the client data that is stored by the first server computer;

if a difference does not exist, then periodically repeating the comparing step until said difference exists, then performing said primary modification procedure, wherein comparing the client data stored by the client computer to client data stored by the first server computer includes transmitting by messaging a DNS formatted message from the client computer to the first server computer, the DNS formatted message having a prerequisite section for containing a prerequisite condition and an update instructions section for containing update instructions.

6. The method as defined in claim 5, wherein the network includes a second server computer and said difference does not exist, the method further comprising:

performing said primary modification procedure one or more times, said first server computer receiving and storing said first data set from said client computer for each said primary modification procedure performed, said second server computer having stored therein one or more of said first data sets previously received from said first server computer;

transmitting from the first server computer to the second server computer each said first data set that is stored by first server computer and that is not stored by the second server computer, said second server computer receiving and storing each said first data set that is so transmitted by said first server computer.

7. The method as defined in claim 6, wherein:

the first server computer and the second server computer are both DNS server computers;

using said first data set to eliminate the difference from the client data that is stored by the first server computer includes transmitting a DNS formatted message containing the first data set to the first server computer.

8. In a system including a client computer networked to a first server computer, the client computer storing a collection of one or more records representing an IP address of the client computer, said first server computer storing a collection of one or more records representing the IP address of the client computer, the method comprising:

comparing the collection of one or more records representing the IP address of the client computer stored by the client computer to the collection of one or more records representing the IP address of the client computer that is stored by the first server computer; and:

if there is a difference, then performing a modification procedure including the steps of:

identifying a first collection of one or more records representing the minimum number of records to be removed and the minimum number of records to be added to the collection of one or more records representing the IP address of the client computer that is stored by the first server computer so as to eliminate the difference;

using said first collection of one or more records to eliminate the difference;

if there is not a difference, then periodically repeating the comparing step until there is a difference, then performing said modification procedure, wherein comparing the collection of one or more records representing the IP address of the client computer stored by the client computer to the collection of one or more records representing the IP address of the client computer that is stored by the first server computer includes transmitting by messaging a DNS formatted message from the client computer to the first server computer, the DNS formatted message having a prerequisite section for containing a prerequisite condition and an update instructions section for containing update instructions.

9. The method as defined in claim 8, wherein the system includes second server computer, and wherein a difference does not exist between the collection of one or more records-representing the IP address of the client computer stored by the client computer and the collection of one or more records representing the IP address of the client computer that is stored by the first server computer, the method further comprising:

performing said modification procedure one or more times, said first server computer receiving and storing said first collection from said client computer for each said modification procedure performed, said second server computer having stored therein one or more of said first collection previously received from said first server computer;

transmitting from the first server computer to the second server computer each said first collection that is stored by first server computer and that is not stored by the second server computer, said second server computer receiving and storing each said first collection that is so transmitted by said first server computer.

10. The method as defined in claim 9, wherein:

the first server computer and the second server computer are both DNS server computers; and using said first collection of one or more records to eliminate the difference includes transmitting by messaging one or more DNS formatted messages containing the first collection of one or more records to the first server computer.

11. In a system where a client computer having a memory is networked to a primary server computer having a primary memory, wherein the client computer stores a first client computer address representative of the client computer in the memory thereof and the primary memory stores a second client computer address representative of said client computer, an address maintenance method comprising:

establishing a primary connection between the primary server computer and the client computer;

using said primary connection to transfer the first client computer address between said client computer and said primary server computer;

comparing the first client computer address to the second client computer address;

if a difference exists between the first client computer address and the second client computer address, then performing a primary modification procedure including:

identifying a primary transfer that is the minimum software components required to change the second client computer address into the first client computer address;

placing said primary transfer in a primary electronic message;

transferring the primary electronic message via said primary connection to the primary server computer;

using the primary server computer and the primary transfer to change the second client computer address stored in the primary memory of the primary server computer into the first client computer address;

if a difference does not exist between the first client computer address and the second client computer address, then periodically comparing the first client computer address to the second client computer address until a difference therebetween exists, then performing said primary modification procedure, wherein using said primary connection to transfer the first client computer address between said client computer and said primary server computer includes transmitting by messaging a DNS formatted message to the primary server computer, the DNS formatted message having a prerequisite section for containing a prerequisite condition and an update instructions section for containing update instructions.

12. The method as defined in claim 11, wherein the system includes secondary server computer, and wherein the second client computer address stored in the primary memory of the primary server computer is identical to the first client computer address, the method further comprising:

performing said primary modification procedure one or more times, said first server computer receiving and storing said primary transfer from said client computer for each said primary modification procedure performed, said second server computer having stored therein one or more of said primary transfers previously received from said first server computer;

transmitting from the first server computer to the second server computer each said primary transfer that is stored by first server computer and that is not stored by the second server computer, said second server computer receiving and storing each said primary transfer that is so transmitted by said first server computer.

13. The method as defined in claim 12, wherein:

the primary server computer and the secondary server computer are both DNS server computers; and the primary electronic message is one or more DNS formatted messages having the primary transfer therein.

14. A computer readable medium having computer executable instructions carried thereon in a software component including a client process for execution on a client computer and a server process for execution on a server computer that is in a communications network with said client computer, said software component comprising the steps of:

comparing a first data set stored by the client process to a second data set stored by the first server process; and:

if a difference exists, then performing a primary modification procedure including the steps of:

identifying a third data set consisting of the minimum additions and deletions to the second data set so as to eliminate the difference;

using said third data set to eliminate the difference from the second data set stored by the first server process;

if a difference does not exist, then periodically repeating the comparing step until said difference exists, then performing said primary modification procedure, wherein comparing the first data set stored by the client process to the second data set stored by the first server process includes a step representative of transmitting by messaging a DNS formatted message from the client process to the first server process, the DNS formatted message having a prerequisite section for containing a prerequisite condition and an update instructions section for containing update instructions.

15. The computer readable medium as defined in claim 14, wherein the computer readable medium includes a second server process for execution on a second server computer that is in a communications network with said first server computer and said difference does not exist, said software component further comprising the steps of:

performing said primary modification procedure one or more times, said first server process receiving and storing said third data set from said client process for each said primary modification procedure performed, said second server process having stored therein one or more of said third data sets previously received from said first server process;

a step representative of transmitting from the first server process to the second server process each said third data set that is stored by first server process and that is not stored by the second server process, said second server process receiving and storing each said third data set that is so transmitted by said first server process.

16. The computer readable medium as defined in claim 14, wherein the computer readable medium includes a second server process for execution on a second server process that is in a communications network with said first server computer and said difference does not exist, the software component further comprising the steps of:

performing said primary modification procedure one or more times, said first server process receiving and storing said third data set from said client process for each said primary modification procedure performed, said first server process storing a first data element representative of the number of said third data sets so stored, the second server process receiving and storing one or more of said third data sets from said first server process, said second server process also storing a second data element representative of the number of said third data sets stored by said second server process;

performing a secondary comparison operation including:
  comparing the first data element to a second data element;
  producing a true condition when the first data element equals the second data element;
  producing a false condition when the first data element equals the second data element;
  when a false condition exists from said secondary comparison operation, then performing a secondary modification procedure including:
    a step representative of transmitting from said first server process each of said third data sets that the first server process has stored and that the second server process has not stored;
    receiving and storing at said second server process from said first server process each of said third data sets that the first server process has stored that the second server process has not stored, said second server process storing a new second data representative of the number of said third data sets stored by said second server process such that said new second data element is equal to said first data element;
  when a true condition exists from said secondary comparison operation, periodically repeating said secondary comparison operation until a false condition is produced thereby, then performing said secondary modification procedure.

17. The computer readable medium as defined in claim 15, wherein:
  the first server process and the second server process are both DNS server processes;
  using said third data set to eliminate the difference from the second data set stored by the first server process includes a step representative of transmitting a DNS formatted message containing the third data set to the first client process.

18. A computer readable medium having computer executable instructions carried thereon in a software component including a client process for execution on a client computer and a first server process for execution on a first server computer that is in a communications network with said client computer, wherein client data is stored in a memory of the client process and client data is stored in a memory of the first server process, the software component comprising the steps of:

comparing the client data stored by the client process to the client data stored by the first server process; and:
  if a difference exists, then performing a primary modification procedure including the steps of:
    identifying a first data set of the minimum additions and deletions to the client data stored by the first server process so as to eliminate the difference;
    using said first data set to eliminate the difference from the client data that is stored by the first server process;
  if a difference does not exist, then periodically repeating the comparing step until said difference exists, then performing said primary modification procedure, wherein comparing the client data stored by the client process to client data stored by the first server process includes a step representative of transmitting by messaging a DNS formatted message from the client process to the first server process, the DNS formatted message having a prerequisite section for containing a prerequisite condition and an update instructions section for containing update instructions.

19. The computer readable medium as defined in claim 18, wherein the computer readable medium includes a second server process for execution on a second server computer that is in a communications network with said first server computer and said difference does not exist, the software component further comprising the steps of:

performing said primary modification procedure one or more times, said first server process receiving and storing said first data set from said client process for each said primary modification procedure performed, said second server process having stored therein one or more of said first data sets previously received from said first server process;

a step representative of transmitting from the first server process to the second server process each said first data set that is stored by first server process and that is not stored by the second server process, said second server process receiving and storing each said first data set that is so transmitted by said first server process.

20. The computer readable medium as defined in claim 19, wherein:
   the first server process and the second server process are both DNS server processes; and
   using said first data set to eliminate the difference from the client data that is stored by the first server process includes a step representative of transmitting a DNS formatted message containing the first data set to the first server process.

21. A computer readable medium having computer executable instructions carried thereon in a software component including a client process for execution on a client computer and a first server process for execution on a first server computer that is in a communications network with the client computer, the client process storing a collection of one or more records representing an IP address of the client computer, said first server process storing a collection of one or more records representing the IP address of the client computer, the software component comprising the steps of:
   comparing the collection of one or more records representing the IP address of the client computer stored by the client process to the collection of one or more records representing the IP address of the client computer that is stored by the first server process; and:
   if there is a difference, then performing a modification procedure including the steps of:
      identifying a first collection of one or more records representing the minimum number of records to be removed and the minimum number of records to be added to the collection of one or more records representing the IP address of the client computer that is stored by the first server process so as to eliminate the difference;
      using said first collection of one or more records to eliminate the difference;
   if there is not a difference, then periodically repeating the comparing step until there is a difference, then performing said modification procedure, wherein comparing the collection of one or more records representing the IP address of the client computer stored by the client process to the collection of one or more records representing the IP address of the client computer that is stored by the first server process includes a step representative of transmitting by messaging a DNS formatted message from the client process to the first server process, the DNS formatted message having a prerequisite section for containing a prerequisite condition and an update instructions section for containing update instructions, and the prerequisite section contains the IP address of the client computer stored by the client process.

22. The computer readable medium as defined in claim 21, wherein the computer readable medium includes second server process for execution on a second server computer that is in a communications network with the first server computer, and wherein a difference does not exist between the collection of one or more records representing the IP address of the client computer stored by the client process and the collection of one or more records representing the IP address of the client computer that is stored by the first server process, the software component further comprising the steps of:
   performing said modification procedure one or more times, said first server process receiving and storing said first collection from said client process for each said modification procedure performed, said second server process having stored therein one or more of said first collection previously received from said first server process;
   a step representative of transmitting from the first server process to the second server process each said first collection that is stored by first server process and that is not stored by the second server process, said second server process receiving and storing each said first collection that is so transmitted by said first server process.

23. The computer readable medium as defined in claim 22, wherein:
   the first server process and the second server process are both DNS server processes;
   using said first collection of one or more records to eliminate the difference includes a step representative of transmitting by messaging one or more DNS formatted messages containing the first collection of one or more records to the first server process.

24. A computer readable medium having computer executable instructions carried thereon in a software component having a client process for execution on a client computer and a primary server process for execution on a primary server computer in a communications network with the client computer, the client process having a memory and the primary server process having a primary memory, wherein the client process stores a first client computer address representative of the client computer in the memory thereof and the primary server process stores a second client computer address representative of said client computer in the primary memory, the software component comprising the steps of:
   a step representative of establishing a primary connection between the primary server process and the client process;
   a step representative of using said primary connection to transfer the first client computer address between said client process and said primary server process;
   comparing the first client computer address to the second client computer address;
   if a difference exists between the first client computer address and the second client computer address, then performing a primary modification procedure including:
      identifying a primary transfer that is the minimum software components required to change the second client computer address into the first client computer address;
      a step representative of placing said primary transfer in a primary electronic message;
      a step representative of transferring the primary electronic message via said primary connection to the primary server process;
      using the primary server process and the primary transfer to change the second client computer address stored in the primary memory of the primary server process into the first client computer address;
   if a difference does not exist between the first client computer address and the second client computer address, then periodically comparing the first client computer address to the second client computer address until a difference therebetween exists, then performing said primary modification procedure, wherein using said primary connection to transfer the first client computer address between said client process and said primary server process includes a step representative of transmitting by messaging a DNS formatted message to the primary server process, the DNS formatted message having a prerequisite section for containing a prerequisite condition and an update instructions section for containing update instructions and the prerequisite section contains the first client computer address therein.

25. The computer readable medium as defined in claim 24, wherein the computer readable medium includes secondary server process for execution on a secondary server computer that is in a communications network with the primary server computer, and wherein the second client computer address stored in the primary memory of the primary server process is identical to the first client computer address, the software component further comprising the steps of:

performing said primary modification procedure one or more times, said first server process receiving and storing said primary transfer from said client process for each said primary modification procedure performed, said second server process having stored therein one or more of said primary transfers previously received from said first server process;

a step representative of transmitting from the first server process to the second server process each said primary transfer that is stored by first server process and that is not stored by the second server process, said second server process receiving and storing each said primary transfer that is so transmitted by said first server process.

26. The computer readable medium as defined in claim 25, wherein:

the primary server process and the secondary server process are both DNS server processes;

the primary electronic message is one or more DNS formatted messages having the primary transfer therein.

* * * * *

UNITED STATES PATENT AND TRADEMARK OFFICE
CERTIFICATE OF CORRECTION

PATENT NO.   : 6,411,966 B1
DATED        : June 25, 2002
INVENTOR(S)  : Stuart Lup-Sing Kwan and Glenn Alexander Curtis It is certified that error appears in the above-identified patent and that said Letters Patent is hereby corrected as shown below:

<u>Title page,</u>
Item [74], *Attorney, Agent or Firm*, replace "Workman, Nydegger & Seel" with -- Workman, Nydegger & Seeley --

<u>Column 2,</u>
Line 49, after "database by" change "manually" to -- manual --

<u>Column 6,</u>
Line 63, delete the first instance of "published by"

<u>Column 8,</u>
Line 1, after "computer," change "-which" to -- which --

<u>Column 9,</u>
Line 28, after "place in one" delete "ore" and insert -- or --

<u>Column 10,</u>
Line 18, after "programs, system device" delete "s"

<u>Column 12,</u>
Line 47, after "that have not" change "be" to -- been --

<u>Column 14,</u>
Line 10, before "include records" change "Sdata" to -- $S_{data}$ --

Signed and Sealed this

Third Day of December, 2002

JAMES E. ROGAN
*Director of the United States Patent and Trademark Office*